Jan. 23, 1951  S. C. PLATT  2,539,322
PISTOL CAMERA
Filed Dec. 16, 1948
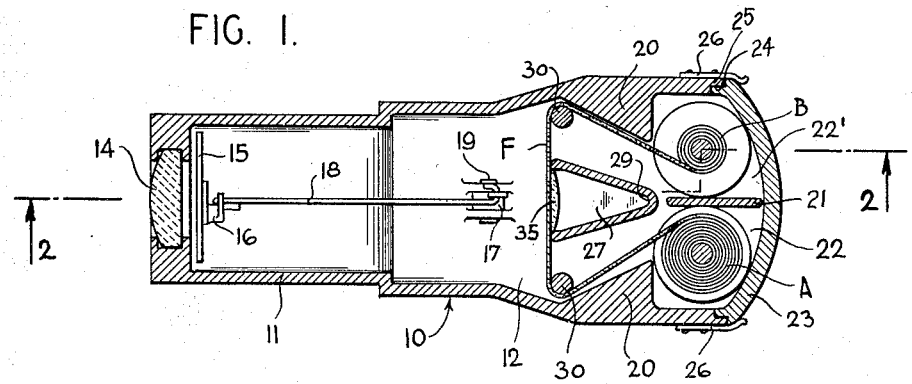
FIG. 1.
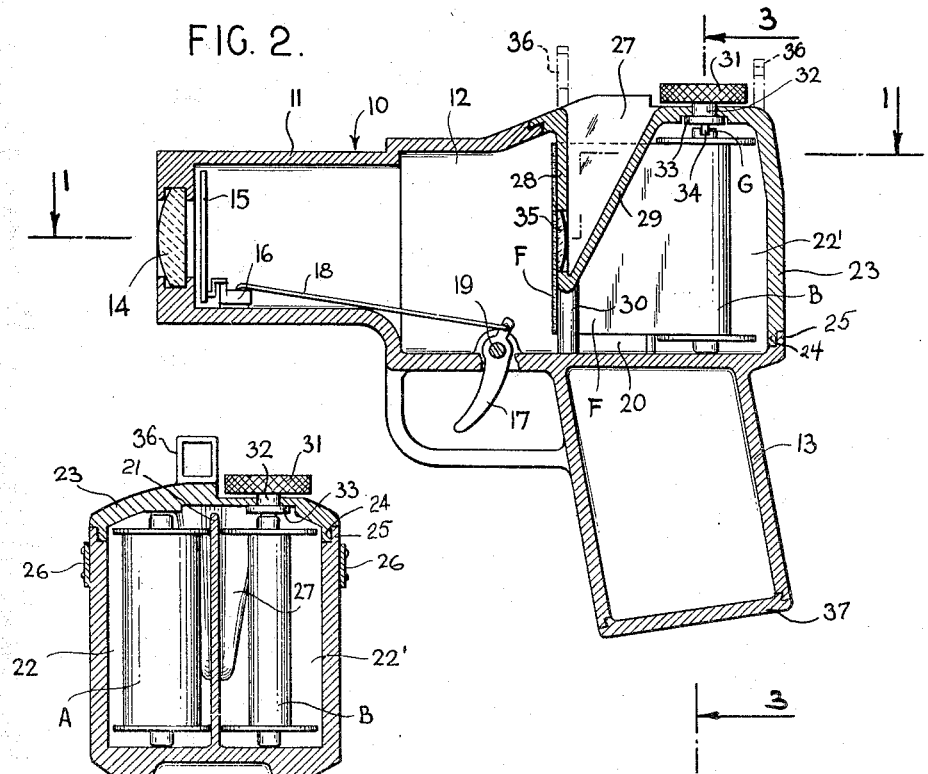
FIG. 2.
FIG. 3.
INVENTOR.
SAMUEL C. PLATT
BY Mock & Blum
ATTORNEYS.

Patented Jan. 23, 1951

2,539,322

UNITED STATES PATENT OFFICE 2,539,322

PISTOL CAMERA

Samuel C. Platt, New York, N. Y.

Application December 16, 1948, Serial No. 65,550

5 Claims. (Cl. 95—34)

1

My invention relates to improvements in cameras, including a camera constructed to resemble a pistol or revolver.

It is one object of my invention to provide a camera having the form of a pistol or revolver which will be particularly attractive to children and which may be used to produce harmless diversion as a toy, as well as serving as a useful photograph-taking device.

Another object of my invention is to provide a camera of the type described in which the operation of the camera is similar to that of a pistol or revolver, the trigger mechanism of the device acting as the shutter-tripping means.

Still another object of my invention is the provision of a camera of the type described which is composed of a minimum of inexpensive parts which may be easily and economically manufactured and assembled.

A further object of my invention is the provision of a camera which can be easily manipulated in order to insert a roll of new film and to remove a roll of exposed film.

These and other objects of my invention will be readily apparent from the following description and drawings, which illustrate a preferred embodiment of the invention, in which, Fig. 1 is a horizontal sectional view of the camera of my invention taken along line 1—1 of Fig. 2;

Fig. 2 is a side sectional view of the camera as taken along line 2—2 of Fig. 1; and Fig. 3 is a rear sectional view of the camera taken along line 3—3 of Fig. 2.

According to my invention, I provide a camera casing designated generally 10, which may be in the form of a pistol or revolver. In the drawings the casing 10 is illustrated as having the form of an automatic revolver, although it is to be understood that the casing may have any shape and may be designed to simulate any portable firearm. The casing 10 is preferably made of plastic, hard rubber or the like. The casing 10 is molded to form a front barrel 11, a rear chamber 12, and a handle 13.

The transverse front wall of the barrel portion 11 contains an objective lens 14 which may be of the fixed-focus or adjustable-focus type. Immediately behind the objective lens 14, a shutter 15 is located, which preferably operates at a constant shutter-speed. The shutter is provided with an actuating or trip member 16 which is connected to a trigger 17 by a rod or wire 18. The trigger 17 may be pivotally attached to the bottom wall of the casing 10 by a pin or rivet 19. To prevent

2 entrance of light rays through the trigger opening in the bottom wall, the adjacent areas may be lined with black felt or other opaque material. The trigger 17 and the connection rod or wire 18 may also be located wholly on the outside of the casing 10, if desired.

The lens 14, shutter 15, and shutter-actuating member 16, are of conventional type, and are not illustrated in detail, since these members in themselves form no part of my invention.

The casing 10 has a longitudinal axis and a longitudinal body-wall.

As shown in Fig. 2, the longitudinal side walls of chamber 12 are provided with integral lugs or projections 20, which extend inwardly and laterally. These lugs 20 are of triangular cross-section in a horizontal plane. Said lugs 20 have proximate walls which are inclined oppositely to the longitudinally axis of the casing and which diverge forwardly, for guiding the film F when it is unwound from the magazine spool A and wound upon the take-up spool B. The casing 10 has a rear opening and a top opening which extends forwardly of said rear opening.

At its rear, the chamber 12 is provided with a cover 23 which has a transverse rear wall and a top wall which extends forwardly of said rear wall. Adjacent its front edge, said top wall of cover 23 has a downwardly extending and downwardly tapered recess 27, which has a planar and lateral front wall 28 and a rear wall 29. The shape of said recess 27 is clearly shown in the drawings. The edges of cover 23 interfit with the edges of the rear and top opening of chamber 12 of casing 10, by means of cooperating rabbets 24 and 25, to provide a light-tight closure.

Spring latches 26 are fixed to the side walls of chamber 12, in order to hold cover 23 releasably in closing position.

The front wall 28 of recess 27 is provided with a sight opening, in which a window 35, made of red glass or red plastic, is held.

The guide rods 39 are integral with the bottom wall of chamber 12. A longitudinal and vertical partition 21 is also integral with the bottom wall of chamber 12. This partition 21 provides compartments 22 and 22'.

When the cover 23 is removed, the magazine spool A and the take-up spool B can be easily inserted into their respective compartments 22 and 22'.

It is well-known to provide a roll of film with a front strip of paper, and also to provide the film of the roll with a backing of protective paper, and to provide said backing paper with markings to indicate the respective frames of the film, or to provide the rear and non-sensitive face of the film with such markings.

While the cover 23 is removed, the front paper strip can be led around the fixed cylindrical and vertical guide posts 30, and the front end of said front paper strip can be fixed to the shaft or rod of the take-up spool B in the usual manner.

The cover 23 is then releasably fixed in its closing position by latches 26.

The peripheries of the spools A and B fit closely against the lugs 20 and partition wall 21 and the inner face of the rear wall of cover 23. As shown in Fig. 3, said spools A and B have smooth integral bottom pins which turnably abut the bottom wall of chamber 12, and said spools A and B have top integral pins which are located close to the inner face of the top wall of cover 23. Hence, by a very simple and cheap construction, the spools A and B are free to rotate, without shifting from their selected axial positions.

The casing 10 and posts 30 and partition 21 can be molded in one piece from a suitable plastic or other material, and the cover 23 can also be molded in one piece, so that the device can be manufactured at minimum cost.

By providing the recess 27 with a vertical, lateral wall, the window 35 can be easily observed. The observation of the respective marking is also facilitated by the shape of recess 27.

A knob 31 is rotatably mounted on the top wall of cover 23 by means of a depending shaft or rod 32 which has a lower flange 33. The flange 33 abuts the inner surface of the top wall of cover 23 and prevents the knob 31 from being removed therefrom. The knob 31 may be mounted for vertical sliding movement in the cover 23 so that when depressed, said knob 31 will contact the top of the inserted take-up spool B. The shaft 32 has a transverse bar 34 on its bottom end which is adapted to fit within the groove G which is provided on film spools of small sizes. When so engaged, the take-up spool B will be rotated when the knob 31 is turned.

When the spool B is thus turned, the respective frame markings will be consecutively visible at the window 35.

The device is provided with the usual sight member 36.

The handle portion 13 is shown in the drawings as being hollow. The hollow portion is of sufficient size to house an extra roll of film for convenient storage. For this purpose, the bottom wall 37 of said handle portion 13 may be made removable.

While a preferred embodiment of my invention has been shown and described, it is obvious that numerous alterations, additions and omissions may be made in my invention without departing from the spirit and scope thereof. The members holding and actuating the film have been shown in a form which actuate a film of small size. If the camera is to be made to hold film spools of different construction, it is to be understood that these members may be altered accordingly.

The word "pistol-camera" when used in the appended claims, is intended to designate in all instances a camera having the form of a pistol, revolver, or any other type of hand fire-arm.

I claim:

1. A camera comprising an elongated, narrow, hollow body in the form of a pistol, adapted to hold a film take-up spool and a magazine film spool containing film having numeral-bearing protective paper, said hollow body having a rear opening through which said spools may be inserted and removed, and a removable cover shaped to close said rear opening when said cover is in closing position, said hollow body having an objective lens at the front end thereof and a central longitudinally-disposed, upstanding partition wall which is integral with the bottom inner surface of said hollow body, said partition wall being adjacent the rear end of said hollow body, said hollow body also having integral lugs extending laterally inward from the inner side surfaces of said hollow body forwardly of said partition wall, said partition wall and said lugs and said cover being shaped and located to provide a pair of adjacent and transversely-alined spool compartments when said cover is in closing position, said compartments being sized to turnably contain the respective magazine film spool and take-up spool in closely-spaced transverse alinement and separated by said partition wall, with the peripheries of said spools substantially abutting the surfaces of said compartments to prevent substantial transverse movement of said spools, said cover having manual means to turn one of said inserted spools, said hollow body having film guide means for guiding the film from said magazine spool to said take-up spool across a transverse run which is located forwardly of said spool compartments, the top wall of said cover having a downwardly-extending recess which has a front recess wall provided with a sight opening, said front recess-wall being positioned to abut the film on said transverse run, said sight opening being located to register with the respective numerals on the protective paper of said film.

2. A camera comprising an elongated, narrow, hollow body in the form of a pistol, adapted to hold a film take-up spool and a magazine film spool containing film having numeral-bearing protective paper, said hollow body having a rear opening and a longitudinal top opening which extends forwardly from said rear opening, said openings being sized to permit the insertion and removal of said spools therethrough, and a removable cover shaped to close said openings when said cover is in closing position, said hollow body having an objective lens at the front end thereof and a central, longitudinally-disposed, upstanding narrow partition wall which is integral with the bottom inner surface of said hollow body, said partition wall being adjacent the rear end of said hollow body, said hollow body also having integral lugs extending laterally inward from the inner side surfaces of said hollow body forwardly of said partition wall, said partition wall and said lugs and said cover being shaped and located to provide a pair of adjacent and transversely-alined closed spool compartments when said cover is in closing position, said compartments being to turnably contain the respective magazine film spool and take-up spool in closely-spaced transverse alinement and separated by said partition wall, with the peripheries of said spools substantially abutting the surfaces of said compartments to prevent appreciable transverse movement of said spools, said cover having manual means to turn one of said inserted spools, said hollow body having film guide means for guiding the film from said magazine spool to said take-up spool, said film guide means being located in transversely alined and spaced relation adjacent the respective opposite inner side surfaces of said hollow body forwardly of said spool compartments, whereby the film from said magazine spool is guided across substantially the entire width of the hollow body, forwardly of said spools, the top wall of said cover having a downwardly-extending recess which has a front recess-wall provided with a sight opening, said front recess wall being positioned to abut the film guided between said guide means, said sight opening being located to register with the respective numerals on the protective paper of said film.

3. A camera according to claim 2 in which the film guide means comprises a pair of upstanding posts which are integral with the bottom surface of said hollow body.

4. A camera according to claim 2 in which the lugs of said hollow body have proximate faces which are inclined oppositely relative to the longitudinal axis of the camera, and diverage forwardly, said film guide means being upstanding posts which are integral with the bottom surface of said hollow body and are located sufficiently close to said lugs to guide the film along the proximate faces of said lugs.

5. A camera according to claim 2 in which the front recess-wall of the downwardly-extending cover recess is substantially planar and perpendicular to the longitudinal axis of the camera, said recess having an inclined rear recess-wall, said recess being tapered from its closed lower end towards the top wall of the cover, whereby the sight opening in said front recess-wall is visible from the top rear of said camera.

SAMUEL C. PLATT.

REFERENCES CITED

The following references are of record in the file of this patent:

UNITED STATES PATENTS

| Number | Name | Date |
|---|---|---|
| 665,691 | Mosher | Jan. 8, 1901 |
| 1,272,635 | De Marco | July 16, 1918 |
| 1,616,301 | Brady et al. | Feb. 1, 1927 |
| 2,029,476 | Githens | Feb. 4, 1936 |

FOREIGN PATENTS

| Number | Country | Date |
|---|---|---|
| 810,974 | France | Jan. 9, 1937 |
| 494,527 | Great Britain | Oct. 27, 1938 |